FIG. 7a
FIG. 7b
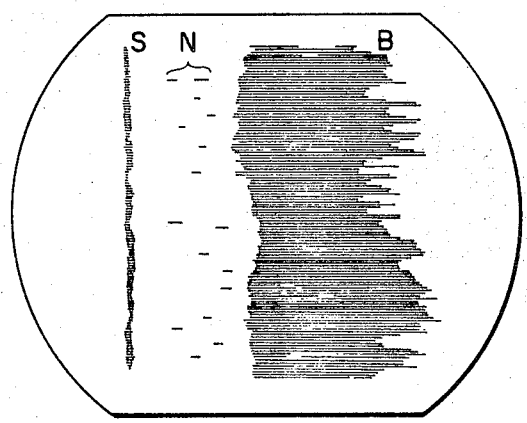
FIG. 8a           FIG. 8b
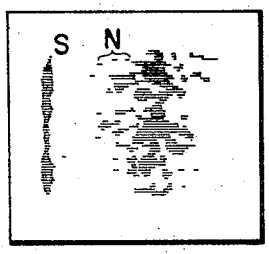   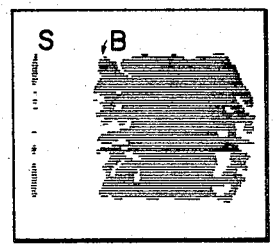

United States Patent Office 3,570,305
Patented Mar. 16, 1971

3,570,305
APPARATUS FOR MEASURING DEPTH OF
CHILLED LAYER ON CAST IRON ROLL
Soji Sasaki, Hitachi-shi, Japan, assignor to Hitachi, Ltd.,
and Hitachi Metals, Ltd., both of Tokyo-to, Japan
Filed Mar. 11, 1968, Ser. No. 712,089
Claims priority, application Japan, Mar. 20, 1967,
42/17,292
Int. Cl. G01n 9/24
U.S. Cl. 73—67.7
8 Claims

ABSTRACT OF THE DISCLOSURE

An apparatus for measuring the depth of the chilled layer on a cast iron roll by use of the ultrasonic pulse echo system which utilizes a T-R coupled probe, the improvement being characterized in that there is provided an adjustable slit in a baffle between the receiver and the transmitter so as to adjust an amount of the surface echo signals to be received independently of the boundary echo signals.

---

This invention relates to an apparatus for non-destructively measuring the depth of a chilled layer on a cast iron roll by means of an ultrasonic pulse-echo method.

A cast iron roll which is widely used for rolling mills is constituted of a core and an outer chilled layer. Since the depth of the chilled layer has a great influence upon the strength, the durability, and the operating characteristics of the roll, apparatuses for non-destructively measuring the depth of the chilled layer have been earnestly sought.

It is well known that conventional ultrasonic pulse-echo flaw detectors have been employed for measuring chill depth on cast iron rolls wherein the chill depth is determined by measurement of a time difference between the instant that ultrasonic pulses signals are projected into the surface and the instant that echo signals from the boundary between the core and the chilled layer arrive at the surface. According to the conventional ultrasonic pulse-echo flaw detectors, however, it is quite difficult to separate or distinguish the boundary echo signals from the surface echo signals or other scattered echo signals.

It is an object of the present invention to provide an ultrasonic probe having both a transmitting transducer and a receiving transducer which can easily separate boundary echo signals produced by reflection or scattering phenomenon at the boundary of the chilled layer and the core region of a cast iron roll from surface echo signals produced at the surface of the cast iron roll wherein depth of the chilled layer can be determined in accordance with a time difference between the boundary echo signals and the surface echo signals both received on the probe.

Still another object of the invention is to provide an apparatus for measuring the depth of chilled layer on a cast iron roll in which scanning of the probe is made in cooperation with a device for displaying or indicating received echo signals so that the boundary echo signals may be easily distinguished from other scattered echo signals and thereby precise and speedy measurements may be made.

Still another object of the invention is to provide an apparatus for measuring the depth of chilled layer on a cast iron roll by the ultrasonic pulse echo method in which the frequency range of ultrasonic energy to be transmitted is chosen such that the boundary echo signals on the indefinite chilled roll may be made most clearly distinguishable.

According to the invention, an apparatus for measuring the depth of chilled layer is provided with a new probe that distinctly separates the boundary echo signals from surface echo signals which are echoes from the surface of pulsed ultrasonic energy projected on the cast iron roll wherein only the strength of surface echo signals which function as a position indicating signal of the surface is made adjustable so as to be a proper amount.

Further, according to the invention the above mentioned new probe scans by means of continuous sliding along the surface of the roll and an echo signal indicating cathode ray tube is swept in synchronization with this scanning operation of the probe so that the boundary echo signals are displayed in a clear continuous pattern wherein the boundary echo signals can be easily distinguished from other random noise echo signals and the depth of chilled layer or the existence of inner flaws can be significantly interpreted on the tube.

Furthermore, in cast iron rolls, particularly indefinite chilled rolls there appear suspended graphite flakes in the chilled layer which produce scattering echo signals to disturb detection of the boundary echo signals and make the measurement of the chill depth very difficult. In order to solve this problem, a frequency of pulsed ultrasonic energy to be used according to the invention is chosen such that reflectivity of the graphite flakes in the chilled layer is much less than that of the boundary between the core and chilled layer so as to clearly distinguish the boundary echo signals. The applicants has found that this frequency is in a range less than 3 megacycles per second.

These and other objects and advantages of the invention will be apparent from the following description of both the prior arts and the preferred embodiments of the present invention, taken in conjunction with the following drawings.

FIG. 1b is a signal waveform diagram relating to the device of FIG. 1a;

FIG. 2b is a signal waveform diagram relating to the device of FIG. 2a;

FIG. 3b is a signal waveform diagram relating to the device of FIG. 3a;

FIG. 7a is an example of an echo pattern displayed on the cathode ray tube to show a distribution of chill depth and FIG. 7b is a displayed pattern explaining the influence of the ultrasonic frequency employed on echo patterns; and FIGS. 8a and 8b are further examples of displayed patterns to explain the influence of the ultrasonic frequency employed on echo patterns.

With reference to the drawings, and particular FIG. 1a through FIG. 3b, several known arrangements will be explained in detail so as to make known certain disadvantages thereof which are eliminated by the present invention.

Figure 1A:
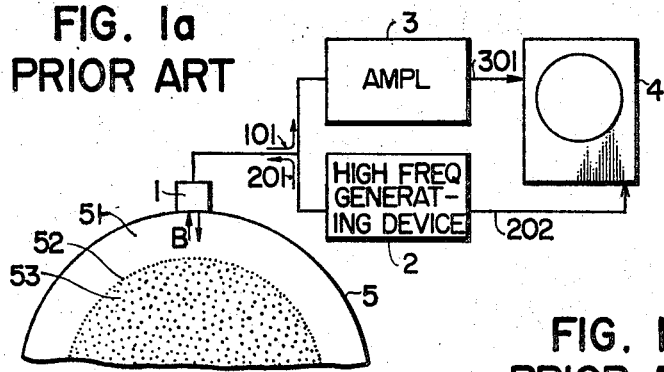
FIG. 1a is a diagrammatic view to explain a conventional single-probe direct contact method for measurement of chill depth.

FIG. 1a shows a diagrammatic explanatory view of a single probe direct contact system for measurement of chill depth wherein a single probe is used to transmit and receive ultrasonic energy, which probe is directly in contact with a cast iron roll 5 to be measured. The system includes a probe 1, a high frequency generating device 2 for supplying high frequency pulses 201 to probe 1 to produce ultrasonic energy and direct it into the iron roll 5, an amplifier 3 for amplifying signals corresponding to ultrasonic echo signals 101 received at the probe 1 from within the roll 5, and a cathode ray tube indicating device 4 for displaying waveforms of the output signals 301 of amplifier 3, in which scanning of the time axis is made by trigger signals 202 obtained from the high frequency generating device 2. The cast iron roll 5 of which the chill depth is to be measured consists of a chilled layer 51 thereof, a core region 53 thereof, and a boundary 52 formed between the chilled layer 51 and core 53.

Figure 1B:

When ultrasonic pulsed energy is produced at the probe 1 by applied high frequency pulses from generator 2, amplifier 3 is also provided with a part of the applied high frequency pulse so that there appears a transmitting signal waveform T in the output signals 301 of amplifier 3 which is to be indicated on indicating device 4, as seen in FIG. 1b. Pulsed ultrasonic energy is also projected at this time into the roll 5 through the chilled layer to be measured and after being reflected at the boundary 52, it is again received as a boundary echo signal B a delay time $t$ after the transmitting signals waveform T. This time delay $t$ between the boundary echo signal B and the transmitted signal T is the time of propagation of the ultrasonic pulse through the chilled layer to the boundary 52 and back and is proportional to the chill depth. Accordingly, chill depth can be determined by measurement of the time difference $t$ between receipt of the signals T and B. According to this known method, however, transmitted pulse signals T are generally too strong and consequently their duration is so long that precise measurement of the time difference $t$ is extremely difficult, as is apparent from FIG. 1b. Furthermore, since the gain of amplifier 3 drops extremely rapidly for the duration of the signals T measurement of the depth becomes impossible in cases where the chill depth is relatively small.

Figure 2A:
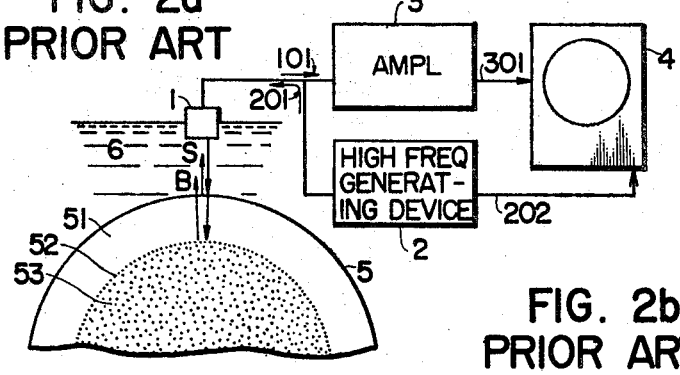
FIG. 2a is a diagrammatic view of a conventional apparatus for measuring chill depth according to so-called single-probe immersion method.
Figure 2B:

FIG. 2a shows a diagrammatic view of an apparatus for measuring chill depth according to the so-called single-probe immersion method in which like numerals and letters are used to denote like or corresponding parts as provided in the system of FIG. 1a. According to the immersion method a liquid medium 6 is inserted between probe 1 and roll 5 and transmission and reception of ultrasonic energy on probe 1 is accomplished through the liquid medium 6. Except for the foregoing, each part of the apparatus operates similarly to that of FIG. 1a. Following the transmitted pulse signals T, surface echo signals S and succeeding boundary echo signals B are displayed on the indicating device 4 where the time difference $t$ between peak points of S and B is measured to determine chill depth, as seen in FIG. 2b. According to this method, scanning of the probe 1 can be accomplished by continuously moving or sliding it along the surface of roll 5 to be measured and thereby continuous and automatic measurement of chill depth can be attained. Furthermore, since according to this configuration measurement is carried out in connection with the signals S and B, any malfunction of amplifier 3 occurring just after receipt of transmitted pulse signals T will not affect the measurement, thus the apparatus can be applicable even for the case where the chill depth is small as compared to the minimum depth measurable by the apparatus shown in FIG. 1a.

On the other hand, since in most cases the strength of surface echo signals S as well as their duration is much larger than that of the boundary echo signals, this method has a disadvantage in that the boundary echo signals are masked by the surface echo signals in the case where the chill depth is very small. It will be appreciated from the foregoing that measurement of chill depth according to a single-probe or one transducer method, such as shown in FIGS. 1a and 2a becomes considerably difficult irrespective of the measuring method utilized when chilled layers of rolls are very thin.

Figure 3A:
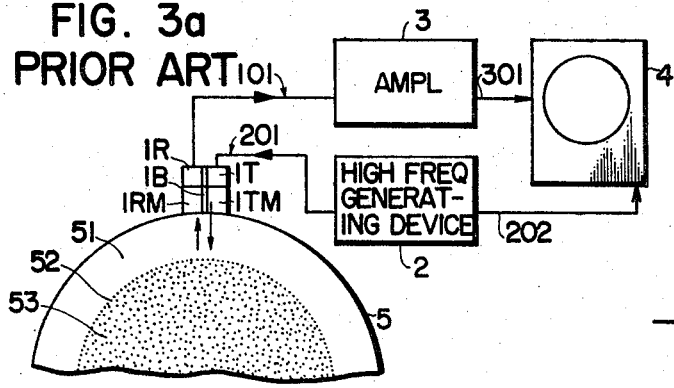
FIG. 3a is a diagrammatic view to explain a conventional direct contact method with a T-R coupled type probe for measurement of chill depth.
Figure 3B:

In order to solve the above mentioned difficulties in the one-transducer method, a method employing a so-called T-R coupled probe, such as shown in the FIG. 3a, has been adopted. In this method, ultrasonic pulse energy generated by transmitter 1T is projected into roll 5 to be measured through suitable medium 1TM and a boundary echo signal B produced at the boundary between chilled layer 51 and core region 53 is received by receiver 1R through another medium 1RM.

Since medium 1TM and medium 1RM are acoustically isolated from each other by a partition or baffle 1B, surface echo signals generated at the surface of roll 5 are not received by receiver 1R. Accordingly, waveforms appearing on indicating device 4 are limited only to pulse signals T' which are induced by high freqeuncy transmitting pulses in the transmitting line and boundary echo singals B. Since according to this method there is no surface echo signals to indicate a reference position corresponding to the surface of a sampled roll, it is inconvenient and difficult to employ this method to accurately measure or determine the depth of the chilled layer.

Figure 4:
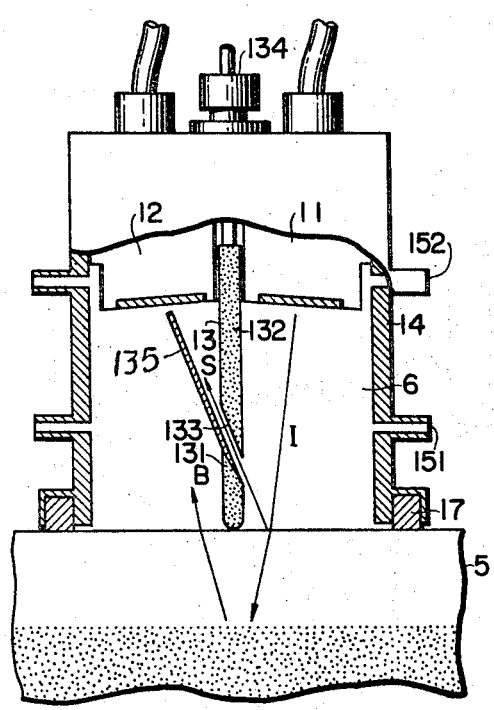
FIG. 4 shows a partial longitudinal section of a T-R coupled type probe according to the present invention.

In order to eliminate those disadvantages inherent in the conventional methods, an apparatus for measuring chill depth according to the invention is provided with a T-R coupled probe, as shown in the FIG. 4, in which surface echo signals of a proper strength can be received and the strength can be made easily adjustable.

In FIG. 4, a transmitter 11 is provided for transmitting a beam of pulsed ultrasonic energy at the roll 5 and a receiver 12 is provided for receiving echo signals, such as S or B of the reflected pulsed ultrasonic energy. A liquid medium 6, such as water, oil or other liquid capable of propagating ultrasonic energy efficiently, is inserted, respectively, between roll 5 and both the receiver 12 and the transmitter 11.

A baffle 13 is provided for interrupting the ultrasonic energy and comprises a fixed baffle 131 and a movable baffle 132, one edge or a top end of the fixed baffle 131 being positioned with sufficient proximity to the surface of the roll 5 to prevent passage of the surface echo signals to the receiver 12. The movable baffle 132 is capable of being moved up and down by means of a screw mechanism 134 so that a crevice or slit 133 between the baffles 131 and 132 may be adjusted in width. Further, the fixed baffle 131 supports a guide plate 135 for restraining dispersion of the surface echo signals S. A case 14 is provided for holding both transmitter 11 and receiver 12 to maintain these elements always in a constant relation to the surface of roll 5 and also this case serves to contain the liquid medium 6. An inlet 151 and an outlet 152 are provided for medium 6 in the case 14. A packing means or gasket 17 makes tight contact between case 14 and roll 5 and prevents the outflow of medium 6.

Figure 5A:
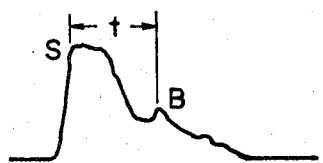
FIGS. 5a and 5b show received signal waveforms to explain performance of an ultrasonic probe according to the present invention.
Figure 5B:
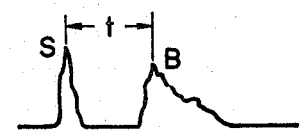

Operation of the probe shown in FIG. 4 will be explained in reference to FIG. 5a and 5b. According to the invention, a depth of the chilled layer on a cast iron roll 5 can be estimated or determined by a time difference between boundary echo signals B and surface echo signals S which after passing through the slit 133 in baffle 13 are received or sensed by receiver 12. In case the boundary is close to the surface of the roll so that the chilled layer is relatively thin, the surface echo signals S will be very strong and the received signal waveforms will be as shown in the FIG. 5a where the boundary echo signals B are masked by the surface echo signals S and will be considerably difficult to distinguish. In such case, the slit 133 is made narrower by adjustment of movable baffle 132 with the result that the strength of the received surface echo signals is reduced so that the reecived surface echo signal waveform becomes sharp as shown in FIG. 5b. Thus, the boundary echo signals are easily distinguishable and consequently, reading or measuring of the time difference t between signals S and B corresponding to the depth of the chilled layer is easily and accurately accomplished.

Figure 6:
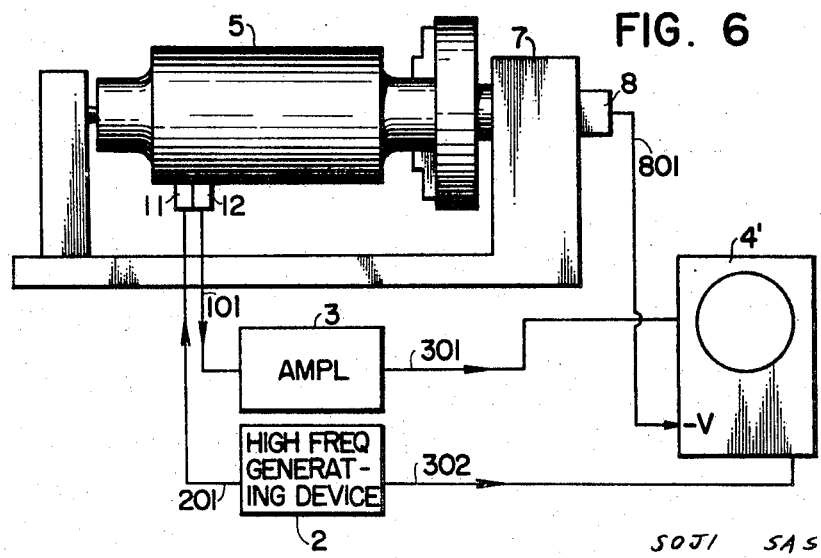
FIG. 6 is a diagrammatic view of an apparatus of the present invention for measuring chill depth on a cast iron roll.

An embodiment of a signal indicating system will be described which is employed in the present invention so as to make boundary echo signals informative and distinct from other random signals. FIG. 6 is a systematic diagram of an apparatus according to the invention, including a cathode ray tube or oscilloscope 4' wherein the brightness of the scanning lines can be modulated by the input signals 301, a driving mechanism 7 for rotating a roll to be measured and a rotary angle signal generator 8 which is made up of a contiuous potentiometer and a voltage source and generates an electrical signal 801 proportional to the rotated angle of roll 5. If the signal 801 is applied to the vertical axis input terminal V of cathode ray oscilloscope 4', the scanning line of the oscilloscope 4' moves, for example, from top to bottom in accordance with rotation of the roll. When the roll makes a full turn and the probe 1 completes scanning of the entire periphery of the roll, the scanning line jumps back from the lower end to the upper end.

FIG. 7a shows an example of an echo signal pattern which is formed by vertical sweeping of the scanning line modulated in intensity by echo signal 301 in synchronization with scanning of the probe. Signal S represents surface echo signals due to the surface of the roll and indicates surface position of the roll, signal B shows boundary echo signals and signal N shows noise echo signals generated in the region of the chilled layer. In the pattern of FIG. 7b, the longitudinal direction corresponds to the circular direction on the periphery of the roll, and each horizontal distance between S and B indicates the depth of chilled layer of the corresponding position of the periphery of the roll. Accordingly, the echo signal pattern of FIG. 7b shows a distribution of the depth of the chilled layer in the region which is scanned by the probe.

According to the above indicating method the noise signals N appear on the indicating device at random, and in contrast the boundary echo signals B form a continuous stripe on the pattern, the left side edge of which corresponds to the distribution of the depth of the chilled layer so that the boundary echo signals can be easily distinguishable from the noise echo signal and measurement can be carried out in an extremely efficient manner at the same time.

Another feature of the present invention is selection or determination of a specific frequency range of ultrasonic energy to be used for measurement of chill depth of indefinite chilled rolls. Since there are scattered graphite flakes even in the outer chilled layer on indefinite chilled rolls, scattered echo signals of utrasonic energy due to these graphite flakes disturb detection of boundary echo signals. This difficulty is avoided according to this invention by employment of such a frequency range of ultrasonic energy as to show considerably small reflectivity with respect to the graphite flakes in the chilled layer and on the contrary to show much larger reflectivity with respect to the boundary thereof.

From many experiments conducted on various indefinite chilled rolls, it has been found that the preferable frequency of ultrasonic energy is in a range less than 3 megacycles per second. This fact may be also explained from a theoretical ground which indicates that when the size of obstructions in an acoustic field is about a fifth or sixth of a wavelength of the ultrasonic energy to be projected, reflectivity with respect to the obstructions decreases rapidly. Although a frequency range of ultrasonic energy should be necessarily less than 3 mc./s. so as to show small reflectivity with respect to graphite flakes in the chilled layer, the most preferable frequency should be determined within the range, with characteristics of material of each roll to be measured being taken into consideration.

FIGS. 8a and 8b show examples of a distribution of chill depth to be observed when the same indefinite chilled roll is measured on the same portion thereof by using ultrasonic energy of 2.25 mc./s. and 1.5 mc./s., respectively. Although as shown by FIG. 8a there appears a considerable amount of noise echo N produced in chilled layer when 2.25 mc./s. is used, the noise echo N is reduced as shown by FIG. 8b to a negligible amount and the boundary echo B is made very distinct when 1.5 mc./s. is used. Since in this case a freqeuncy less than 1.5 mc./s. has a decreased resolution, use of an unnecessarily low frequency results in failure of measurement. In this case, therefore, it will be noted that 1.5 mc./s. ultrasonic energy is most suitable.

Even in case the frequency is chosen in a range less than 3 mc./s. to measure the depth of chilled layer, it will be needless to say that if a probe of such a mechanism as shown in FIG. 4 is used, separation of the boundary echo signals from the other noise signals is made much better and easier and thereby a distribution of chill depth is more easily determined. Furthermore, it will be noted that the above frequency range is effectively employed in the echo signal indictaing device shown in FIG. 6 in which indication of echo signals is made in synchronization with the scanning of the probe around a sample roll so that the boundary echo signals may become more informative and be more distinct from the noise signals.

From the foregoing description it will be appreciated that by use of an apparatus for measuring chill depth on cast iron rolls according to the present invention, non-destructive measurement of the depth of chilled layer on chilled rolls or indefinite chilled rolls can be made efficienty and precisely, and consequently, the apparatus according to the present invention has a great merit on quality control of cast iron rolls.

Although the invention has been described in connection with certain modifications thereof, it will now be understood that further modifications may now suggest themselves to those skilled in the art and it is intended to cover such modifications as fall within the scope of the appended claims.

I claim:

1. In an apparatus for measuring the depth of a certain boundary within a specimen by the ultrasonic pulse-echo system which comprises a probe having transmitting means for transmitting ultrasonic pulse signals to the specimen, receiving means for receiving echo signals from both the surface and the boundary of the specimen, and said transmitting means and receiving means being positioned in fixed relation with each other and at a certain distance from the surface of the specimen, and partition means disposed between said transmitting means and said receiving means to acoustically isolate one from the other; a liquid medium provided between the surface of the specimen and both said transmitting means and said receiving means; and indication means for measuring in proper time relation both the surface echo signals and the boundary echo signals wherein the depth of the boundary may be determined in accordance with a time difference between the boundary echo signals and surface echo signals; the improvement being characterized in that said partition means consists of a fixed baffle and a movable baffle, one edge of said fixed baffle being positioned with sufficient proximity to the surface of the specimen to prevent passage of the surface echo signals to said receiving means, and the other edge of said fixed baffle being opposed to one edge of said movable baffle to form an adjustable slit for controllably passing the surface echo signal therebetween to said receiving means.

2. An apparatus for measuring the depth of a certain boundary within a specimen according to claim 1, wherein the fixed baffle of said partition means is provided with guide plate means for restraining dispersion of the surface echo signals.

3. An apparatus for measuring the depth of a certain boundary within a specimen according to claim 1, wherein said slit for controllably passing the surface echo signals to said receiving means is disposed at an angle to the longitudinal plane of said partition means.

4. An apparatus for measuring the depth of a certain boundary within a specimen according to claim 3, wherein said slit is directed along a line extending from a point on the surface of said specimen toward said receiving means.

5. An appaartus for measuring the depth of a certain boundary within a specimen according to claim 4, wherein the fixed baffle of said partition means is provided with guide plate means for restraining dispersion of the surface echo signals.

6. An apparatus for measuring the depth of a certain boundary within a specimen according to claim 5, wherein said guide plate means is formed by a plate secured at said other edge of said fixed baffle and extending substantially in the direction of said slit.

7. An apparatus for measuring the depth of a certain boundary within a specimen according to claim 1 in which said transmitting means produces ultrasonic pulse signals having a frequency in a range less than 3 megacycles per per second.

8. In an appaartus for measuring the depth of the chilled layer on a cast iron roll by the ultrasonic pulse-echo system, which comprises a probe having transmitting means for transmitting ultrasonic pulse signals to the cast iron roll, receiving means for receiving echo signals from both the surface and the boundary of the cast iron roll, and said transmitting means and receiving means being positioned in fixed relation with each other and at a certain distance from the surface of the cast iron roll, and partition means disposed between said transmitting means and said receiving means to acoustically isolate one from the other; a liquid medium provided between the surface of the cast iron roll and both said transmitting means and said receiving means; and indication means for measuring in proper time relation both the surface echo signals and the boundary echo signals wherein the depth of the boundary may be determined in accordance with a time difference between the boundary echo signals and surface echo signals; the improvement being characterized in that said partition means consists of a fixed baffle and a movable baffle, one edge of said fixed baffle being positioned with sufficient proximity to the surface of the cast iron roll to prevent passage of the surface echo signals to said receiving means, and the other edge of said fixed baffle being opposed to one edge of said movable baffle to form an adjustable slit for controllably passing the surface echo signal therebetween to said receiving means.

References Cited

UNITED STATES PATENTS

| | | | |
|---|---|---|---|
| 3,011,339 | 12/1961 | Furon | 73—67.9 |
| 3,132,510 | 5/1964 | Buchan et al. | 73—67.7 |
| 3,228,232 | 1/1966 | Proctor | 73—67.7 |
| 3,309,914 | 3/1967 | Wetghart | 73—67.9 |

RICHARD QUIESSER, Primary Examiner

J. WHALEN J. W., Assistant Examiner